Figure 3:
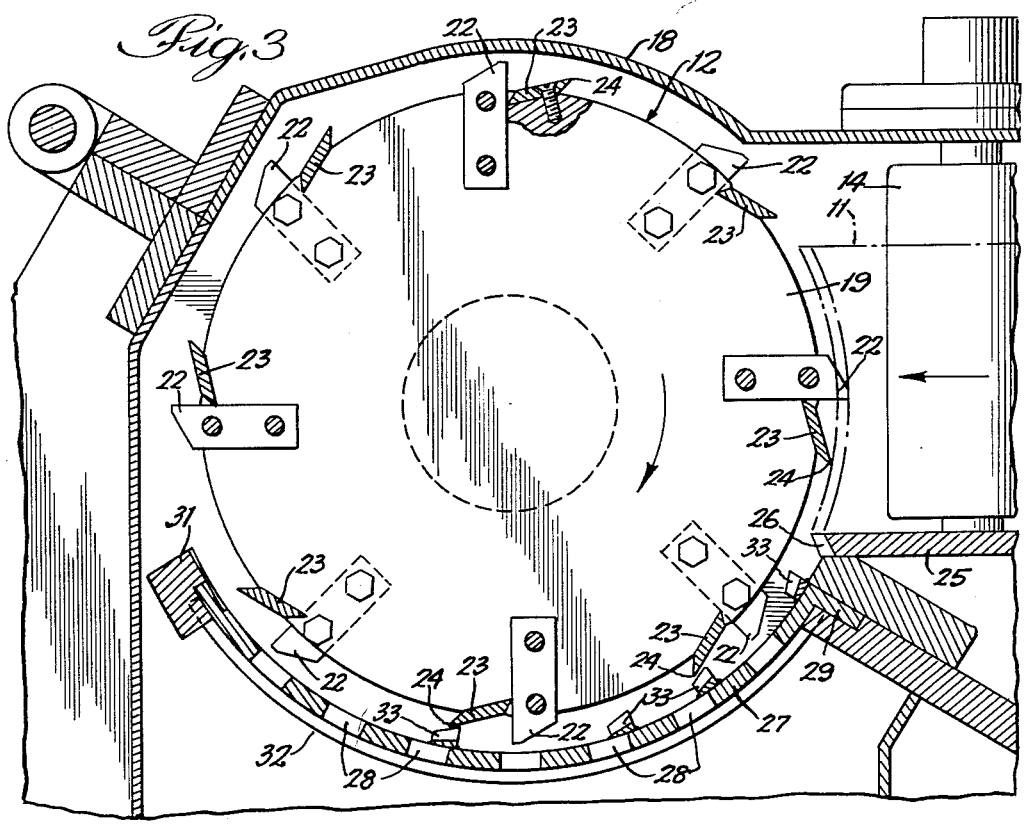

Sept. 26, 1961    A. KIRCHER, JR    3,001,728
CUTTER FOR ELASTIC MATERIALS
Filed May 9, 1960    2 Sheets-Sheet 1
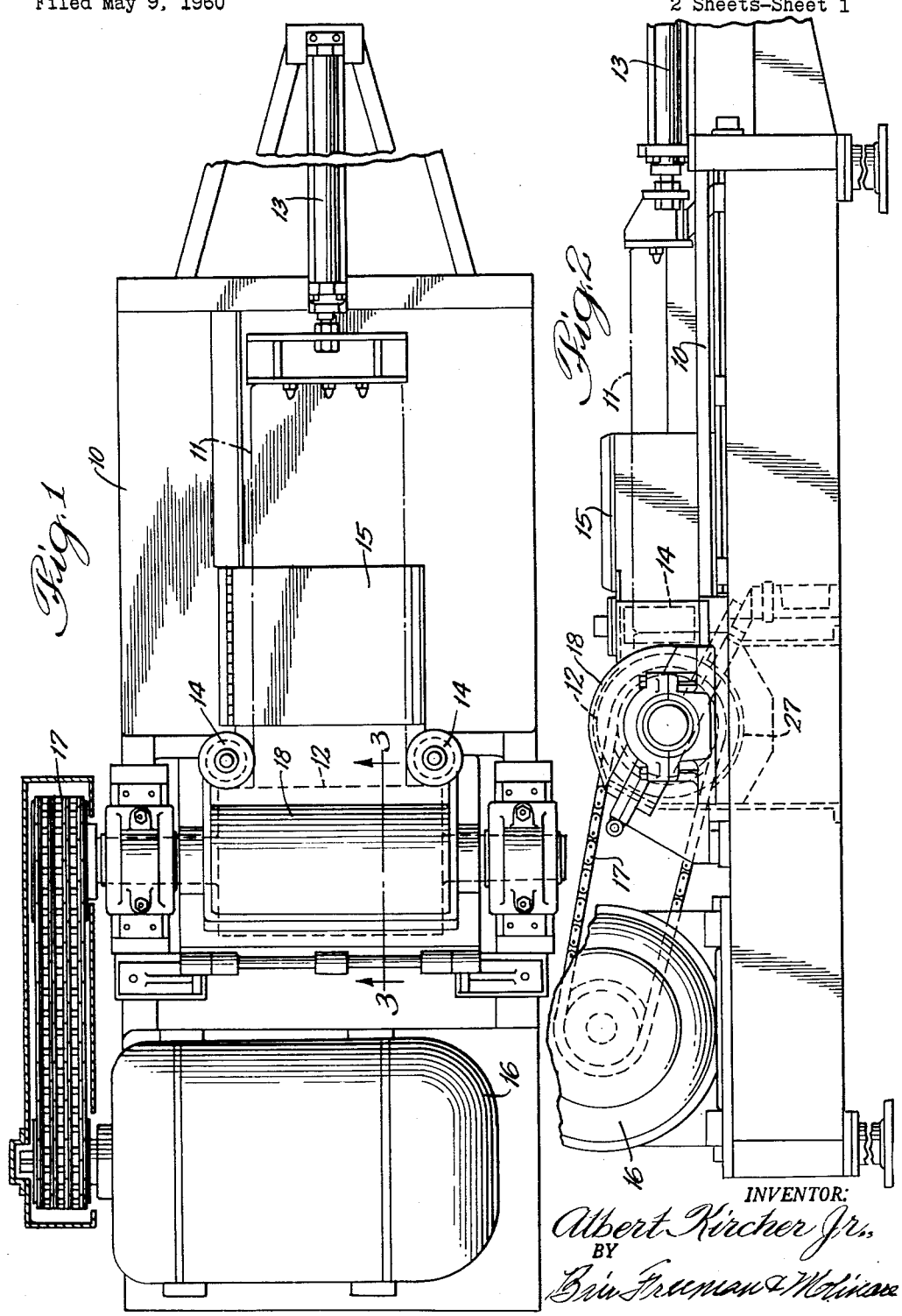
INVENTOR:
Albert Kircher Jr.,
BY
ATTORNEYS.

Sept. 26, 1961  A. KIRCHER, JR  3,001,728
CUTTER FOR ELASTIC MATERIALS
Filed May 9, 1960  2 Sheets-Sheet 2

INVENTOR:
Albert Kircher Jr.,
BY
Bair, Freeman & Molinare
ATTORNEYS.

United States Patent Office 3,001,728
Patented Sept. 26, 1961

3,001,728
CUTTER FOR ELASTIC MATERIALS
Albert Kircher, Jr., Downers Grove, Ill., assignor to The Fitzpatrick Company, a corporation of Illinois
Filed May 9, 1960, Ser. No. 27,658
5 Claims. (Cl. 241—73)

This invention relates to cutters for elastic materials and more particularly to apparatus for breaking down bales or blocks of resinous material, such as synthetic rubber or the like, into relatively small particles.

In various phases of the rubber and plastic industries it becomes necessary to break down bales or blocks of elastic resinous materials into small particles. For example, in the synthetic rubber industry it is common to supply bales or blocks of synthetic rubber materials such as that commonly known in the trade as GR–S, which may be either a pure resin or a resin mixed with carbon black. Such materials must frequently be broken down to small particle sizes to facilitate dissolving thereof in styrene or other solvents, or for similar manufacturing operations.

It has been the usual practice to cut a bale of such material into strips or slabs one inch to two inches in thickness and to feed such slabs into a rotary knife cutter to cut them into small pieces. The power required for such a cutting operation is excessive, and feeding of slabs into the cutter must be handled with a great deal of care in order not to overload the cutter or to overheat the product. The operation is therefore laborious and uneconomical.

It is accordingly one of the objects of the present invention to provide a cutter for elastic materials in which bales or blocks or such materials are reduced to relatively small particles in a single operation with a minimum power consumption and without overheating the material.

Another object is to provide a cutter for elastic materials in which the face of the block or bale is first grooved and the material is then cut off in relatively thin slices to form particles of a desired size.

According to a feature of the invention, a bale or block of elastic material is fed radially into a skeleton rotor carrying a series of radially extending cutters to cut grooves across the face of the bale and a series of axially extending cutting blades to cut off thin slices from the face of the bale. Preferably the bale rests on a bed-plate which terminates close to the cutting knives and is notched for passage of the radial cutters therethrough.

According to another feature of the invention, a screen underlies the rotor having perforations therein to pass particles of the desired maximum size and carrying a series of cutter bars similar to the bed-plate further to cut the particles and to reduce them to the desired maximum size.

Figure 4:
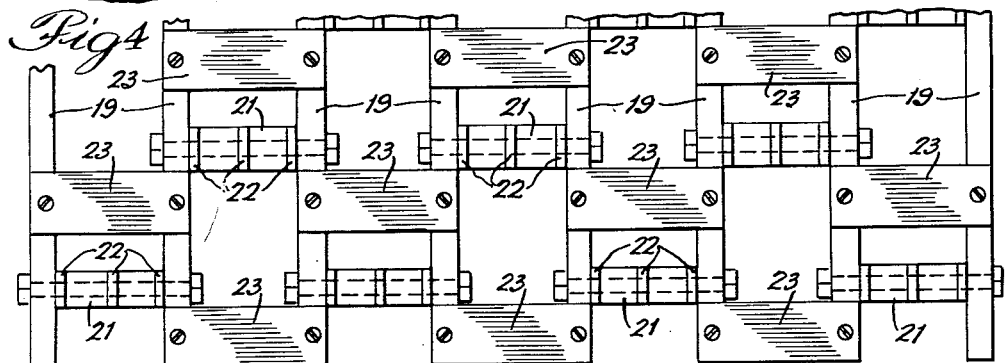
Figure 5:
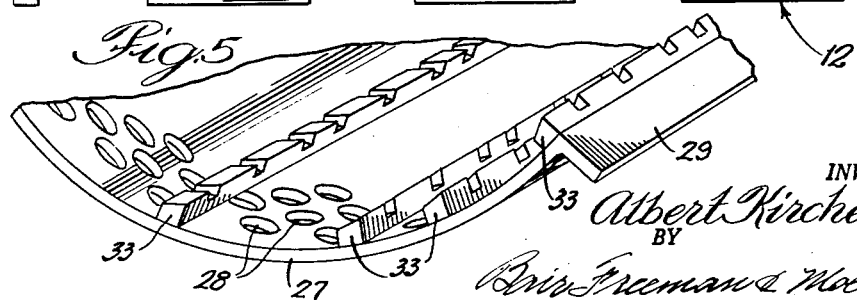

The above, and other objects and features of the invention, will be more readily apparent from a following description when read in connection with the accompanying drawing in which:

FIGURE 1 is a plan view of a cutter embodying the invention with parts broken away and in section;
FIG. 2 is a partial side elevation of the cutters;
FIG. 3 is a transverse section on the line 3—3 of FIG. 1;
FIG. 4 is a partial face view of the rotor;
FIG. 5 is a partial perspective view of the screen.

The cutter as shown in FIGS. 1 and 2 comprises a feed table 10 on which a bale 11 of elastic materials such as synthetic rubber is slidably supported. The bale 11 is advanced toward a cutting rotor indicated generally at 12 by a fluid cylinder 13 which maintains a desired feeding pressure on the bale urging it toward the rotor. The bale is guided by vertical side rollers 14 engaging the sides of the bale adjacent to the rotor 12 to insure proper centering thereof relative to the rotor, and may be at least partially covered by a top plate 15 to prevent buckling thereof.

The rotor is driven by an electric motor 16 mounted on the feed table 10 and connected to the rotor through sprocket chains 17 or other desirable driving mechanism. As best seen in FIG. 3, the rotor 12 is enclosed in a housing 18 which covers the top and one side of the rotor leaving the other side open for feeding of the bale thereto. The housing is open at its bottom for discharge of the cut particles therefrom.

The rotor itself, as best seen in FIGS. 3 and 4, is formed by a series of spaced, parallel discs 19 formed of steel or other suitable material, and mounted on a central driven shaft which is driven by the sprocket chains 17. The discs 19 have secured thereto by bolts or the like cross bars 21 which preferably span the space between adjacent discs and which carry radially extending cutters 22, projecting beyond the periphery of the discs 19. Following each of the bars 21 in the direction of rotation of the rotor, is a cutting blade 23 which is set into notches in the periphery of the disc 19 as best seen in FIG. 3 so that the blades lie at a slight angle to a tangent to the discs. The blades are formed with cutting edges 24 which lie slightly radially beyond the peripheries of the discs and which are formed with a rake angle to cut the material from a bale in relatively thin slices.

The bale to be cut is supported adjacent to the rotor by a bed-plate 25 lying generally level with the feed table 10 and extending closely adjacent to the periphery of the rotor. The bed-plate is formed with notches 26 at its leading edge which are spaced so that the cutters 22 may pass closely through them and between the cutters 22 the bed-plate terminates closely adjacent to the cutting edges of the blades 24 so that the material will be completely severed from the bale.

According to one of the features of the invention, the bed-plate 25 and supporting plate 10 are spaced at a level below the level of the rotor axis so that the bale will be fed into the rotor with its vertical center line at approximately the level of the rotor axis. The normal bale is approximately 6 inches thick and for this purpose the bed-plate and supporting plate are positioned at a level approximately 3 inches below the rotor axis. As a result of this construction, the bale neither tends to be pulled into or rejected by the rotor and during operation the rotor blades 23 will tend to dig into the face of the bale and cut off therefrom chips approximately equal to the projection of the blades beyond the periphery of the discs 19.

The screeen 27 underlies and closes the space beneath the rotor and is formed with a series of openings 28 therein of a size to pass the maximum desired particle size without allowing any larger particles to pass therethrough. As shown, the screen is anchored at one end as indicated at 29 to the frame of the machine and is supported at its opposite end by a cross-beam 31. Preferably arcuate reinforcing strips 32 underlie the screen to support and rigidify it so it will not bend under the stresses imposed thereon during operation.

According to another feature of the invention, the screen is formed with a series of spaced cutter bars 33 extending axially of its length. As shown, four such cutter bars are provided although it will be apparent that more or less could be used as required. Each of the cutter bars is formed in a manner similar to the bed-plate 25 with its outer edge provided with notches through which the radially extending cutters 22 will pass closely and with the bar between the notches lying closely adjacent to the cutting edges 24 of the blades 23.

In operation, a bale of elastic materials such as synthetic rubber is placed on the supporting plate 10 and is urged toward the rotor with a uniform feeding pressure by the fluid cylinder 13. With the rotor turning, the cutters 22 will form radial grooves across the face of the bale shown at 11 and as the cutting blades 23 follow up across the face of the bale, they will shave thin chips therefrom whose width cannot exceed the space between adjacent grooves. Due to the action of the bed-plate 25, these chips will be cut cleanly from the face of the bale and are further cut as they are carried by the cutters and blades past the several cutter bars 33 on the screen. Particles of the desired maximum size or less will drop through the openings 28 in the screen and may be collected in any desired type of container for use.

It has been found that with the use of machine, according to the present invention driven by a 60-H.P. motor, a normal grade and quality of rubber can be cut into particles having a maximum dimension of approximately one-half inch. A standard bale of synthetic rubber of the grade noted above, can be cut in approximately one minute. It has further been found that the average temperature of the product will be approximately 120° F. with no readings in excess of 130° F. under any conditions. This is due largely to the manner of cutting and to the fact that the rotor, being of skeleton construction, does not create excessive friction against the face of the bale.

While one embodiment of the invention has been shown and described in detail, it will be understood that this is illustrative only and is not to be taken as a definition of the scope of the invention, reference being had for this purpose to the amended claims.

What is claimed is:

1. A cutter for elastic materials comprising a cylindrical rotor, means to drive the rotor for rotation about its axis, means for feeding a block of elastic material radially toward the periphery of the rotor, a series of axially spaced cutters projecting radially from the rotor to cut grooves across the face of the block, a series of axially extending blades at the periphery of the rotor with their leading edges angling outward from the rotor to cut off the material at the face of the block between the grooves, an arcuate screen underlying the bottom of the rotor and formed with openings therein through which the cut material may pass, and a plurality of circumferentially spaced cutter bars carried by the screen spaced radially closely adjacent to the leading edges of the blades and having notches therein through which the cutters may pass.

2. A cutter for elastic material comprising a cylindrical rotor formed by a plurality of axially spaced discs which are thin axially relative to the space between them, means to drive the rotor, means to feed a block of elastic material to be cut radially toward the rotor, a series of axially spaced cutters projecting radially from the rotor to cut grooves across the face of the block, and a series of axially extending cutting blades carried by the rotor at its periphery with their leading edges angling outward from the rotor, the cutting blades spanning the spaces between adjacent discs so that material cut thereby can move into the spaces between adjacent discs.

3. The cutter of claim 2 further including a bed plate adjacent to the periphery of the rotor on which the block rests positioned with one edge spaced closely from the cutting blades and having notches therein through which the cutters pass, an arcuate screen underlying the rotor downstream from the bed plate and formed with openings through which the cut material may pass, and a plurality of spaced cutter bars carried by the screen spaced radially close to the cutting blades and having notches therein through which the cutters may pass.

4. The cutter of claim 3 in which the feeding means includes a fluid motor to maintain a substantially constant feeding pressure on the block.

5. A cutter for elastic materials comprising a cylindrical rotor, means to feed a block of elastic material to be cut radially toward the rotor, a series of axially spaced and axially thin cutters projecting radially from the rotor to cut a series of spaced grooves across the face of the block, a series of axially spaced cutting blades carried by the rotor with their leading edges angling outward from the rotor and terminating radially within the tips of the cutters to slice off the face of the block between the spaced grooves therein, and a bed plate adjacent to the periphery of the rotor on which the block rests and formed with notches therein only slightly greater in width than the cutters and through which the tips of the cutters pass, the edge portions of the bed plate between the notches lying closely adjacent to the path of travel of the leading edges of the cutting blades.

References Cited in the file of this patent
UNITED STATES PATENTS

| | | |
|---|---|---|
| 438,198 | Spangler | Oct. 14, 1890 |
| 1,197,370 | Helm | Sept. 5, 1916 |
| 2,811,183 | Mottet | Oct. 29, 1957 |

FOREIGN PATENTS

| | | |
|---|---|---|
| 21,339 | Finland | Sept. 30, 1946 |